(12) United States Patent
Hirose et al.

(10) Patent No.: US 10,550,746 B2
(45) Date of Patent: Feb. 4, 2020

(54) HONEYCOMB STRUCTURE, AND MANUFACTURING METHOD OF HONEYCOMB STRUCTURE

(71) Applicant: NGK INSULATORS, LTD., Nagoya (JP)

(72) Inventors: Shogo Hirose, Nagoya (JP); Shiori Nakao, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 146 days.

(21) Appl. No.: 15/460,401

(22) Filed: Mar. 16, 2017

(65) Prior Publication Data
US 2017/0276049 A1 Sep. 28, 2017

(30) Foreign Application Priority Data
Mar. 28, 2016 (JP) ................. 2016-063507

(51) Int. Cl.
*B01J 35/04* (2006.01)
*F01N 3/28* (2006.01)
(Continued)

(52) U.S. Cl.
CPC ....... *F01N 3/2828* (2013.01); *B01D 53/9431* (2013.01); *B01J 35/04* (2013.01);
(Continued)

(58) Field of Classification Search
CPC ............. C04B 38/0009; C04B 35/00; C04B 2111/00793; C04B 2111/0081; C04B 38/0006; B01D 2255/9032; B01D 2255/9035; B01D 2255/9202; B01D 53/9431; B01J 35/04; B01J 37/0009; B28B 11/243; B28B 2003/203; B28B 3/269; F01N 2570/14; F01N 3/2828
See application file for complete search history.

(56) References Cited

U.S. PATENT DOCUMENTS 4,810,554 A 3/1989 Hattori et al.
7,488,412 B2 2/2009 Abe et al.
(Continued)

FOREIGN PATENT DOCUMENTS

DE 11 2013 000 714 T5 11/2014
EP 2 366 444 A1 9/2011
(Continued)

OTHER PUBLICATIONS

German Office Action (Application No. 10 2017 002 577.0) dated Oct. 22, 2018 (with English translation).
(Continued)

*Primary Examiner* — David Sample
*Assistant Examiner* — Elizabeth Collister
(74) *Attorney, Agent, or Firm* — Burr & Brown, PLLC (57) ABSTRACT

A honeycomb structure has partition walls defining a plurality of polygonal cells which become through channels for a fluid, a structure end face vertical to an axial direction has at least two cell regions possessing mutually different cell structures and surrounded by circumferential portions, and in the cell regions adjacent to each other, to first partition walls of a first cell structure of one first cell region, second partition walls of a second cell structure of the other or second cell region are tilted.

8 Claims, 5 Drawing Sheets

(51) Int. Cl.
- *B01D 53/94* (2006.01)
- *B01J 37/00* (2006.01)
- *B28B 3/26* (2006.01)
- *B28B 11/24* (2006.01)
- *B28B 3/20* (2006.01)

(52) U.S. Cl.
CPC .......... *B01J 37/0009* (2013.01); *B28B 3/269* (2013.01); *B28B 11/243* (2013.01); *B01D 2255/9032* (2013.01); *B01D 2255/9035* (2013.01); *B01D 2255/9202* (2013.01); *B28B 2003/203* (2013.01); *F01N 2570/14* (2013.01)

(56) References Cited

U.S. PATENT DOCUMENTS

| | | | |
|---|---|---|---|
| 8,361,592 | B2 | 1/2013 | Miyairi et al. |
| 2004/0131512 | A1 | 7/2004 | Abe et al. |
| 2009/0176053 | A1 | 7/2009 | Miyairi et al. |
| 2014/0205794 | A1* | 7/2014 | Tamai ................ B32B 3/12 428/116 |
| 2014/0287192 | A1* | 9/2014 | Murata ............... B32B 3/12 428/117 |
| 2015/0004353 | A1 | 1/2015 | Hayashi et al. |
| 2015/0005153 | A1* | 1/2015 | Hayashi ............. B01J 32/00 502/87 |

FOREIGN PATENT DOCUMENTS

| | | |
|---|---|---|
| JP | 2003-025316 A1 | 1/2003 |
| JP | 2009-154148 A1 | 7/2009 |
| JP | 2011-194312 A | 10/2011 |
| JP | 2013-173133 A | 9/2013 |
| JP | 2013-173134 A | 9/2013 |
| JP | 2014-136211 A | 7/2014 |
| JP | 2014-180606 A1 | 9/2014 |
| JP | 2014-184371 A | 10/2014 |

OTHER PUBLICATIONS

Japanese Office Action (with English translation), Japanese Application No. 2016-063507, dated Jul. 2, 2019 (10 pages).

* cited by examiner

HONEYCOMB STRUCTURE, AND MANUFACTURING METHOD OF HONEYCOMB STRUCTURE

"The present application is an application based on JP-2016-063507 filed on Mar. 28, 2016 with Japan Patent Office, the entire contents of which are incorporated herein by reference."

BACKGROUND OF THE INVENTION

Field of the Invention

The present invention relates to a honeycomb structure, and a manufacturing method of the honeycomb structure, and more particularly, it relates to a honeycomb structure which is capable of achieving uniformity of a flow rate of a fluid such as an exhaust gas to pass through the honeycomb structure, and a manufacturing method of the honeycomb structure.

Description of the Related Art

Heretofore, an exhaust gas emitted from an internal combustion engine such as a car engine includes toxic substances such as carbon monoxide (CO), hydrocarbons (HC) and nitrogen oxides ($NO_x$). Natural environments, human bodies and others are adversely affected, and hence the toxic substances cannot be discharged to the air as they are. To eliminate this problem, in a middle of an exhaust channel route of the exhaust gas, an exhaust gas purifying device to remove and purify the above toxic substances is usually provided.

As this exhaust gas purifying device, for example, a honeycomb catalytic body is used in which there is used, as a catalyst carrier, a honeycomb structure made of a porous ceramic material and having partition walls defining a plurality of cells to become through channels for a fluid (an exhaust gas), and a catalyst is loaded onto the partition walls of the honeycomb structure. Especially, in a case of purifying the exhaust gas emitted from a diesel engine, there is used a technology of selective catalytic reduction (SCR) to convert $NO_x$ into a nitrogen gas and water by use of ammonia ($NH_3$) as a reducing agent, thereby enabling a treatment of $NO_x$ at a high purification efficiency.

A purifying treatment of $NO_x$ will further specifically be described. When passing the exhaust gas of the fluid from one end face (an inflow side) to the other end face (an emission side) of the honeycomb catalytic body, the exhaust gas including $NO_x$ is dispersed to pass through the respective cells. At this time, the catalyst loaded onto the partition walls comes in contact with the exhaust gas. Especially, the honeycomb catalytic body is a structure including a plurality of cells, and hence it is possible to broadly take an opportunity of contact between the exhaust gas and the catalyst and a contact area of the exhaust gas with the catalyst.

As a result, the above exhaust gas purifying device can exert a high $NO_x$ purifying performance. Here, as the catalyst for use, it is possible to select at least one from the group consisting of various metal catalysts such as a metal-substituted zeolite, vanadium, vanadia, titania, tungsten oxide, silver and alumina (e.g., see Patent Document 1).

Furthermore, for the purpose of achieving uniformity of a flow rate of a fluid such as the exhaust gas and eliminating unevenness of a treatment region of the fluid in a structure end face, there has been suggested manufacturing of a honeycomb structure in which a honeycomb body having a high-pressure loss is disposed in a region where the flow rate is high. On the other hand, a honeycomb body having a low pressure loss is disposed in a region where the flow rate is low, whereby respective regions of the structure end face have different cell structures (e.g., see Patent Document 2).

[Patent Document 1] JP-A-2009-154148
[Patent Document 2] JP-A-2003-025316

SUMMARY OF THE INVENTION

Figure 10:
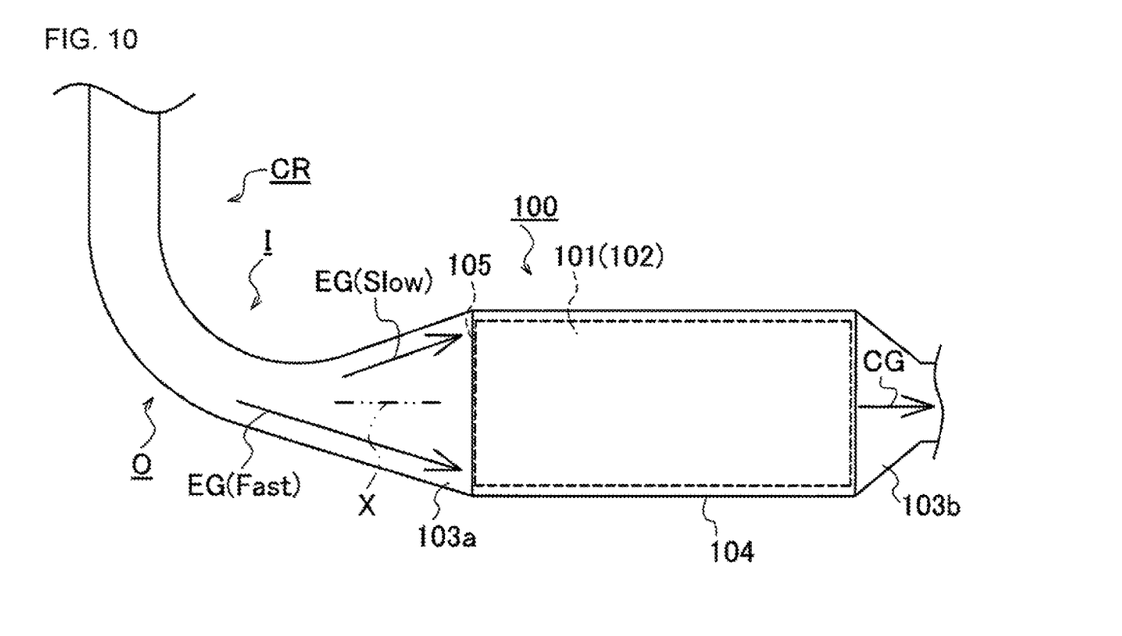
FIG. 10 is an explanatory view schematically showing a behavior of a flow of an exhaust gas in an exhaust gas purifying device in which a conventional honeycomb structure is used.

However, a honeycomb structure for use in the above exhaust gas purifying device has the possibility of causing disadvantages mentioned below. For example, as shown in FIG. 10, an exhaust gas purifying device 100 is mainly installed in an exhaust channel route CR of an exhaust gas EG emitted from a diesel engine or the like. The exhaust gas purifying device 100 includes a honeycomb catalytic body 102 obtained by loading a catalyst (not shown) onto a pillar-shaped honeycomb structure 101, and a metal case 104 possessing a tubular shape capable of accommodating the honeycomb catalytic body 102 therein, and having an inflow portion 103a of the exhaust gas EG at one end and an emitting portion 103b of a purified gas CG which is purified at the other end.

When the exhaust gas purifying device 100 described above is mounted in a diesel car or the like, its installation place is often limited. Therefore, the exhaust gas EG emitted from the diesel engine is sent to the exhaust gas purifying device 100 along the exhaust channel route CR of the exhaust gas EG which is bent in a complicated manner Therefore, as shown in FIG. 10, just before the exhaust gas purifying device 100, the exhaust channel route CR becomes an exhaust channel route bent in a perpendicular direction or an exhaust channel route having another complicated shape (not shown). In this case, in a structure end face 105 vertical to an axial direction X of the honeycomb catalytic body 102 (or the honeycomb structure 101), a flow rate of the exhaust gas EG which flows into the honeycomb catalytic body 102 might not become constant.

For example, in the exhaust gas purifying device 100 of FIG. 10, the flow rate of the exhaust gas EG which passes through the exhaust channel route CR of a curved region bent just before the honeycomb catalytic body 102 is fast on an outer peripheral side O of the exhaust channel route CR, whereas the flow rate of the exhaust gas on an inner peripheral side I of the exhaust channel route CR is usually slow. Therefore, there occurs a situation where the flow rate of the exhaust gas EG is nonuniform in an upper portion and a lower portion of the honeycomb catalytic body 102.

Due to the nonuniformity of the flow rate of the exhaust gas EG, a treatment region of the structure end face 105 to treat the exhaust gas EG might be uneven. That is, a large amount of the exhaust gas EG flows into the honeycomb catalytic body 102 from the lower portion of the structure end face 105 in which the flow rate is fast, and the large amount of the exhaust gas EG does not flow into the upper portion of the structure end face 105 in which the flow rate is slow.

Furthermore, due to the nonuniformity of the above flow rate, there is the possibility that a pressure loss between the inflow portion 103a and the emitting portion 103b in the exhaust gas purifying device 100 increases. Consequently, a purifying treatment of the exhaust gas EG cannot stably be performed.

Furthermore, in a honeycomb structure in which different cell structures are formed in separate regions as disclosed in Patent Document 2, to partition walls (first partition walls) of the cell structure of one cell region of cell regions adjacent to each other, partition walls (second partition walls) of the cell structure of the other cell region are not tilted. As a result, when an external force is applied to the honeycomb structure during canning of the honeycomb structure, a small uneven load is generated especially in a boundary surface between the respective cell regions, and there is the possibility that cracks are generated along the boundary surface.

Therefore, in view of the above situation, an object of the present invention is to provide a honeycomb structure in which uniformity of a flow rate of a fluid is achieved without being limited by an installation place of an exhaust gas purifying device or a shape of an exhaust channel route of a fluid such as an exhaust gas, a treatment region of the fluid in a structure end face is not uneven, a pressure loss is controllable, and generation of cracks during canning is inhibited, and another object thereof is to provide a manufacturing method of the honeycomb structure.

According to a first aspect of the present invention, a honeycomb structure is provided having partition walls defining a plurality of polygonal cells which become through channels for a fluid, wherein a structure end face vertical to an axial direction of the honeycomb structure has at least two cell regions possessing mutually different cell structures and surrounded by circumferential portions, and in the cell regions adjacent to each other, to first partition walls of the cell structure of one cell region, second partition walls of the cell structure of the other cell region are tilted.

According to a second aspect of the present invention, the honeycomb structure according to the above first aspect is provided, wherein the cells are quadrangular, and a tilt angle of the second partition walls to the first partition walls is in a range of 3 to 45°.

According to a third aspect of the present invention, the honeycomb structure according to the above first aspect is provided, wherein the cells are hexagonal, and a tilt angle of the second partition walls to the first partition walls is in a range of 65 to 90°.

According to a fourth aspect of the present invention, the honeycomb structure according to any one of the above first to third aspects is provided, wherein a cell number of incomplete cells which appear in a boundary line between the one cell region and the other cell region and have an incomplete shape is 0.1% or less to a total number of the cells of the structure end face.

According to a fifth aspect of the present invention, the honeycomb structure according to any one of the above first to fourth aspects is provided, wherein a maximum cell region having a maximum end face area in the at least two cell regions occupies a ratio of 25 to 75% to a total structure end face area of the structure end face.

According to a sixth aspect of the present invention, the honeycomb structure according to any one of the above first to fifth aspects is provided, which has a bonding portion interposed between the cell regions.

According to a seventh aspect of the present invention, a manufacturing method of a honeycomb structure to manufacture the honeycomb structure according to any one of the above first to fifth aspects is provided which has partition walls defining a plurality of polygonal cells to become through channels for a fluid and in which a structure end face vertical to an axial direction is formed by combining at least two cell regions possessing mutually different cell structures and surrounded by circumferential portions and in which in the cell regions adjacent to each other, to first partition walls of the cell structure of one cell region, second partition walls of the cell structure of the other cell region are tilted, the manufacturing method including a monolithic forming step of extruding a forming material and monolithically forming the honeycomb structure.

According to an eighth aspect of the resent invention a manufacturing method of a honeycomb structure to manufacture the honeycomb structure according to any one of the above first to sixth aspects is provided which has partition walls defining a plurality of polygonal cells to become through channels for a fluid and in which a structure end face vertical to an axial direction is formed by combining at least two cell regions possessing mutually different cell structures and surrounded by circumferential portions and in which in the cell regions adjacent to each other, to first partition walls of the cell structure of one cell region, second partition walls of the cell structure of the other cell region are tilted, the manufacturing method including a cell region forming step of extruding a forming material and separately forming the cell regions; and a bonding step of combining and bonding the at least two formed cell regions.

According to a honeycomb structure of the present invention, by combining a plurality of cell regions constituted of mutually different cell structures, it is possible to correct nonuniformity of a flow rate, and it is possible to eliminate unevenness of a treatment region of a fluid. Consequently, without being limited by an installation place of an exhaust gas purifying device or a shape of an exhaust channel route, it is possible to maintain a high $NO_x$ purification efficiency.

Furthermore, uniformity of the flow rate is achieved, and hence it is possible to decrease a pressure loss before and after a treatment of an exhaust gas. Furthermore, to partition walls of the cell structure of one cell region of cell regions adjacent to each other, partition walls of the cell structure of the other cell region are tilted, whereby it is possible to inhibit generation of a small uneven load in a boundary surface between the respective cell regions, and it is possible to decrease generation of cracks along the boundary surface.

According to a manufacturing method of a honeycomb structure of the present invention, it is possible to manufacture the honeycomb structure which produces the above effect. Furthermore, it is possible to monolithically form the honeycomb structure constituted of a plurality of cell regions, or it is possible to construct the honeycomb structure of the present invention by separately forming cell regions and combining these cell regions.

DESCRIPTION OF THE PREFERRED EMBODIMENTS

Hereinafter, there will be described a honeycomb structure of the present invention and one example of an embodiment of a manufacturing method of the honeycomb structure, with reference to the drawings. It is to be noted that the present invention is not especially limited to the following embodiments, and changes, modifications, improvements and others are addable without departing from the gist of the present invention.

1. Exhaust Gas Purifying Device

Figure 1:
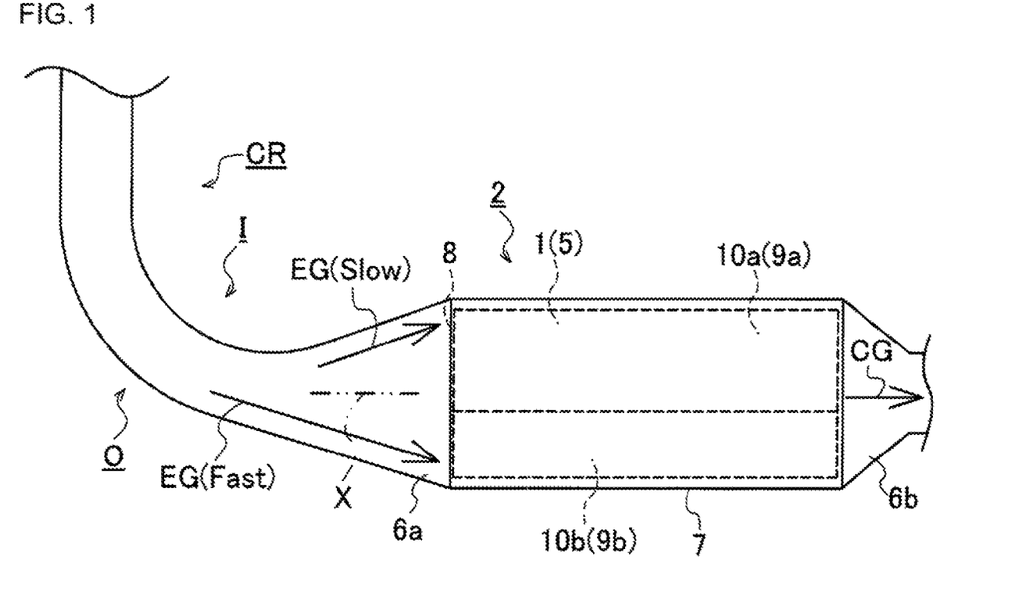
FIG. 1 is an explanatory view schematically showing a behavior of a flow of an exhaust gas in an exhaust gas purifying device in which a honeycomb structure is used.

As shown in FIG. 1, a honeycomb structure 1 of the present embodiment is for use as a part of an exhaust gas purifying device 2 provided in a middle of an exhaust channel route CR of an exhaust gas EG (corresponding to a fluid in the present invention) emitted from an internal combustion engine such as a diesel engine.

Here, the exhaust gas purifying device 2 mainly includes a honeycomb catalytic body 5 constituted of the honeycomb structure 1 of the present embodiment, and a metal case 7 capable of accommodating the honeycomb catalytic body 5 therein. Further specifically, the honeycomb structure 1 has partition walls 4 defining a plurality of polygonal (e.g., quadrangular or hexagonal) cells 3 which extend from one end face to the other end face and become through channels for the exhaust gas EG, and the honeycomb structure is made of a porous ceramic material.

Furthermore, a metal catalyst or the like (not shown) is loaded onto the partition walls 4 of the honeycomb structure 1 to form the honeycomb catalytic body 5. On the other hand, the case 7 includes a substantially tubular case main body (not shown), a substantially conical inflow portion 6a which is extended from one end of the case main body and through which the exhaust gas EG flows into the case 7, and a substantially conical emitting portion 6b which is extended from the other end of the case main body to emit a purified gas CG from the case 7. It is to be noted that the case 7 is made of a metal material such as stainless steel, and a tip of the inflow portion 6a is truncated and connected to the exhaust channel route CR.

2. Honeycomb Structure

Furthermore, the honeycomb structure 1 of the present embodiment will be described in detail. The honeycomb structure includes a structure end face 8 vertical to an axial direction X (see FIG. 1), and the structure end face 8 is constructed by combining two cell regions (a first cell region 10a and a second cell region 10b) constituted of two mutually different cell structures (a first cell structure 9a and a second cell structure 9b) and surrounded by circumferential portions 14, respectively.

Figure 2:
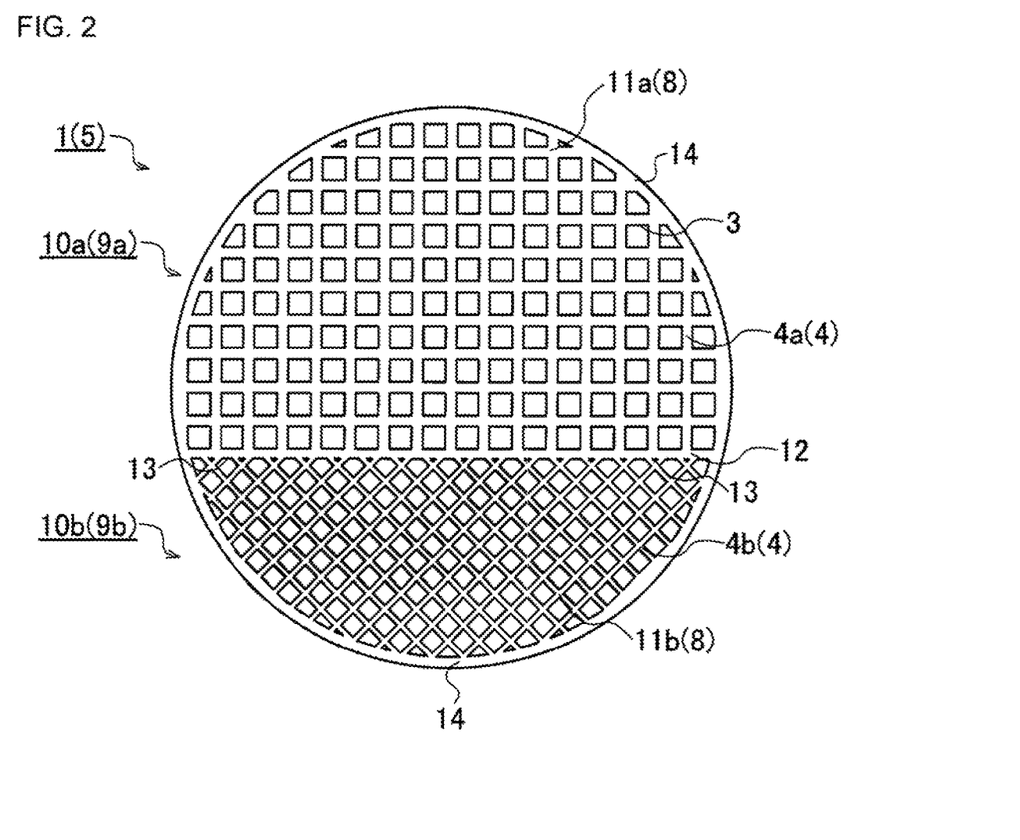
FIG. 2 is a plan view schematically showing one example of a constitution of the honeycomb structure of the present embodiment.

As shown in FIG. 2, the first cell region 10a and the second cell region 10b in the honeycomb structure 1 of the present embodiment have block end faces 11a and 11b whose cross sections are substantially semicircular, respectively. Furthermore, the linear circumferential portions 14 to surround the block end faces 11a and 11b as disposed to face each other, thereby constructing the honeycomb structure 1 whose cross section is round. Here, a region where the linear circumferential portions 14 are superimposed on each other is a boundary line 12 defining the first cell region 10a and the second cell region 10b. On the basis of the boundary line 12, second partition walls 4b of the second cell structure 9b of the second cell region 10b are tilted to first partition walls 4a of the first cell structure 9a of the first cell region 10a (see FIG. 2 and FIG. 3).

More specifically, in the honeycomb structure 1 of the present embodiment, the cell structures (the first cell structure 9a and the second cell structure 9b) are different in the first cell region 10a positioned on the upside of a paper surface of each of FIG. 1 and FIG. 2 and the second cell region 10b positioned on the downside of the paper surface.

Here, examples of a difference between the cell structures include a difference in partition wall thickness (a rib thickness) between the first partition wall 4a and the second partition wall 4b which define the cells 3 in the first cell structure 9a and the second cell structure 9b, and a difference in cell number (cells/cm$^2$ (cells/in$^2$)) per square centimeter (or per square inch) therebetween. Here, in the honeycomb structure 1 of the present embodiment, as compared to the first cell structure 9a of the first cell region 10a, the second cell structure 9b of the second cell region 10b is set so that a cell density is higher and the partition wall thickness is smaller.

That is, in a case of installing the exhaust gas purifying device 2 in the exhaust channel route CR shown in FIG. 1, the second cell region 10b where the cell density is high is disposed on an outer peripheral side O of the exhaust channel route CR having a shape bent just before the exhaust gas purifying device 2, whereas the first cell region 10a where the cell density is lower than that of the second cell region 10b is disposed on an inner peripheral side I of the exhaust channel route CR. Usually, there is the tendency that as the cell density increases, a fluid such as the exhaust gas EG is harder to flow, a flow rate decreases, and a pressure loss increases.

To eliminate such a problem, the second cell region 10b where the cell density is high is intentionally disposed counter to the exhaust gas EG flowing at a fast flow rate on the outer peripheral side O, and the passing-through of the exhaust gas EG can slightly be obstructed. On the other hand, the first cell region 10a where the cell density is low is disposed counter to the exhaust gas EG flowing at a slow flow rate on the inner peripheral side I, and the exhaust gas EG easily flows.

Consequently, as compared with a case where the whole structure end face 8 is constituted of the same cell structure, nonuniformity of the flow rate of the exhaust gas EG can be avoided by disposing a region where the exhaust gas easily flows and a region where the exhaust gas is hard to flow in accordance with a difference in flow rate of the exhaust gas EG. As a result, the flow rate of the exhaust gas EG in the structure end face 8 of the honeycomb structure 1 can be averaged, and a purifying treatment of the exhaust gas EG can stably be performed.

In consequence, a treatment region of the exhaust gas EG is not uneven in the structure end face 8, and due to uniformity of the flow rate, the pressure loss does not increase. Especially, in the honeycomb structure 1 of the present embodiment, to the first partition walls 4a of the first cell region 10a, the second partition walls 4b of the second cell region 10b are tilted, so that the above effect can more stably be obtained.

Further in FIG. 2, it is shown that the boundary line 12 between the first cell region 10a and the second cell region 10b is substantially disposed in the vicinity of a center between the upside and downside of the structure end face 8 of the honeycomb structure 1, but the present invention is not limited to this example, and the boundary line 12 may be disposed at an optional position to the structure end face 8.

Additionally, in the honeycomb structure 1 of the present embodiment, it has been described that the structure end face 8 is divided into two cell regions of the first cell region 10a and the second cell region 10b, but there is not any special restriction on the number of the cell regions to be divided, and the structure end face may be divided into, for example, three or more cell regions.

Figure 4:
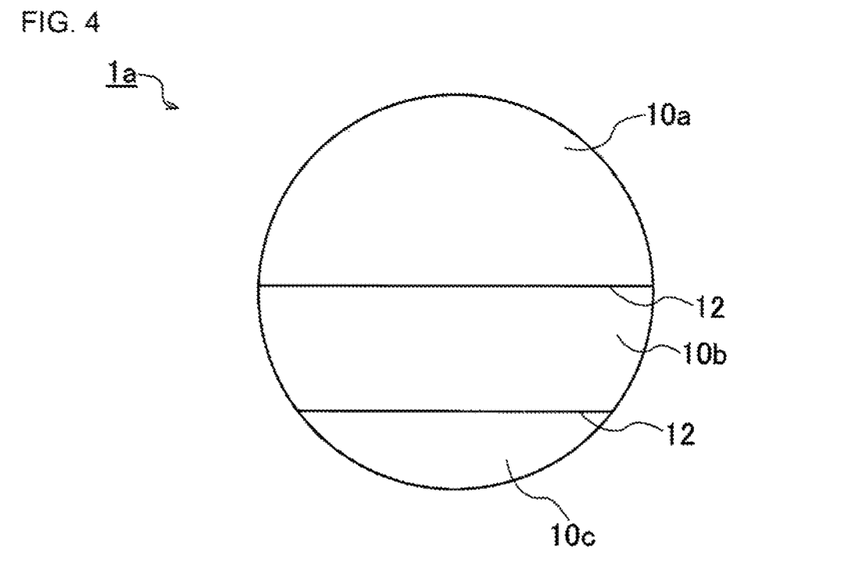
FIG. 4 is an explanatory view showing one example of a honeycomb structure having three cell regions.
Figure 5:
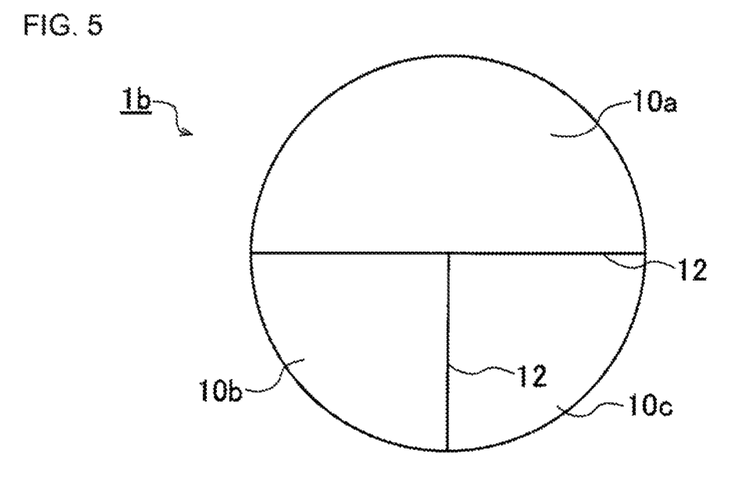
FIG. 5 is an explanatory view showing another example of the honeycomb structure having three cell regions.
Figure 6:
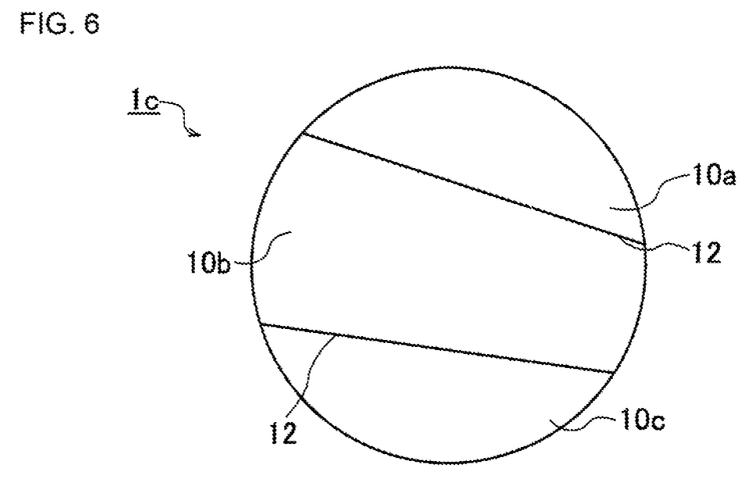
FIG. 6 is an explanatory view showing still another example of the honeycomb structure having three cell regions.

As schematically shown in FIG. 4 to FIG. 6, examples of the honeycomb structure include a honeycomb structure 1a (see FIG. 4) in which a structure end face is divided into a first cell region 10a, a second cell region 10b and a third cell region 10c by two parallel boundary lines 12, a honeycomb structure 1b (see FIG. 5) in which a structure end face 8 is divided into three cell regions by a T-shaped boundary line 12, and a honeycomb structure 1c (see FIG. 6) in which two boundary lines 12 are optionally disposed. Furthermore, a size or a shape of each of the cell regions 10a, 10b and 10c can optionally be set. Similarly, the boundary line 12 is not limited to a straight line, and may include a curved line or the like.

As shown in FIG. 2, in the honeycomb structure 1 of the present embodiment, each of the cells 3 of the respective cell structures 9a and 9b is quadrangular. As described above, in the first cell region 10a and the second cell region 10b which are adjacent to each other, to the lattice-like first partition wall 4a of the first cell structure 9a, the lattice-like second partition wall 4b of the other or second cell structure 9b is tilted at a predetermined tilt angle θ (see FIG. 2 and FIG. 3).

Figure 3:
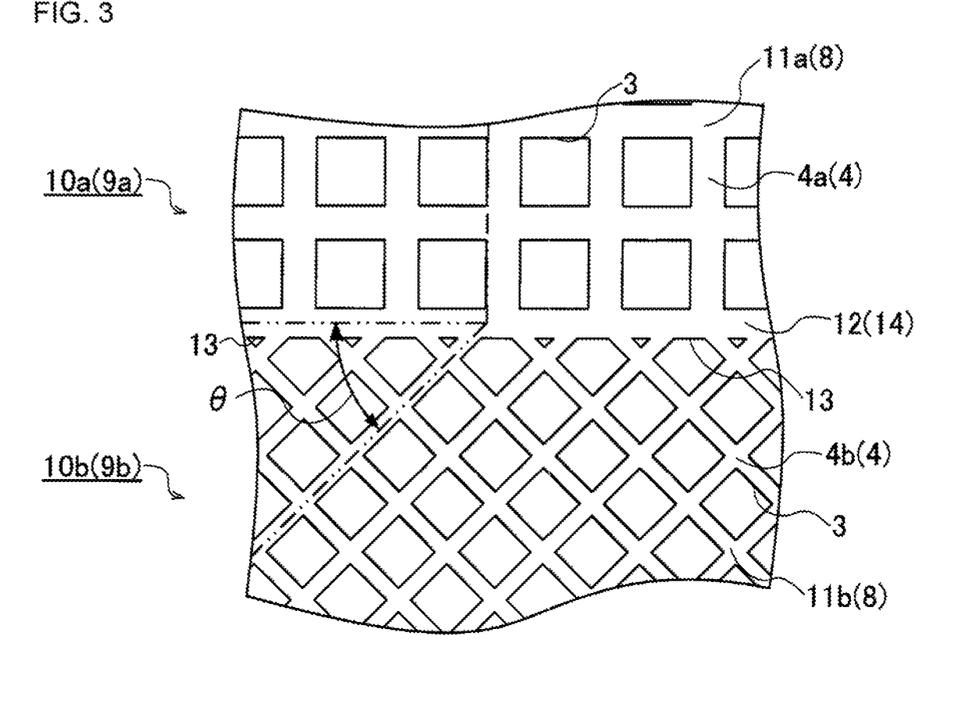
FIG. 3 is a partially enlarged plan view of the honeycomb structure of FIG. 2.

More specifically, as shown in FIG. 2 and FIG. 3, as to the boundary line 12 between the first cell region 10a and the second cell region 10b, the lattice-like first partition walls 4a of the first cell structure 9a are formed to be perpendicular to the boundary line 12 on one side and to be parallel to the boundary line 12 on the other side. On the other hand, the lattice-like second partition walls 4b of the second cell structure 9b are formed to tilt to the boundary line. The second partition walls 4b tilt to the first partition walls 4a, thereby making it possible to acquire a minimum necessary strength in the vicinity of the boundary line 12 (hereinafter referred to as "a boundary region"). Furthermore, it is possible to acquire the strength of the honeycomb structure 1 without causing defects such as chipping or deformation of the partition walls 4 in the boundary region.

In this case, the tilt angle θ of the second partition walls 4b to the first partition walls 4a is set to a range of 5 to 45° to the boundary line 12. When the tilt angle θ is smaller than 5°, an effect of the tilt of the second partition walls 4b to the first partition walls 4a is hardly obtainable. On the other hand, when the tilt angle is in excess of 45°, the partition walls are symmetrically disposed to a virtual line (not shown) perpendicular to the boundary line 12, and hence a similar effect is obtainable.

Figure 7:
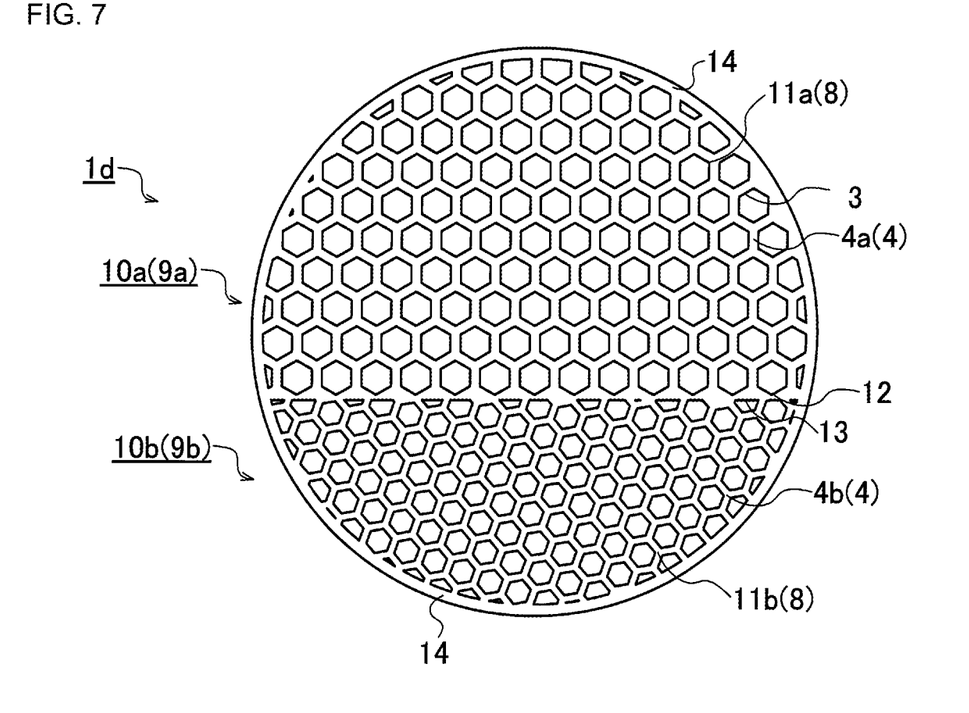
FIG. 7 is a plan view schematically showing another example of the constitution of the honeycomb structure of the present invention.
Figure 8:
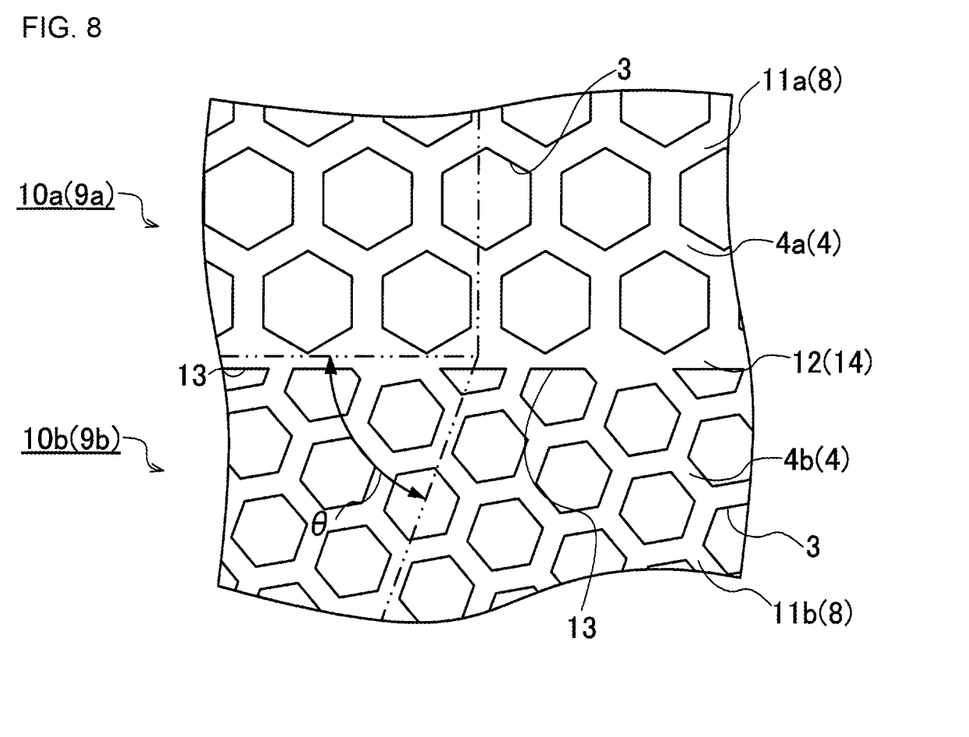
FIG. 8 is a partially enlarged plan view of the honeycomb structure of FIG. 7.

In the honeycomb structure of the present invention, the shape of the cells 3 is not limited to the quadrangular shape as in the present embodiment. For example, as shown in FIG. 7 and FIG. 8, the honeycomb structure can be directed to a honeycomb structure 1d in which cells 3 are hexagonal. In this case, a tilt angle θ of a second partition wall 4b to a first partition wall 4a in the honeycomb structure 1d can be set to a range of 65 to 90°. A reason why the angle is set to such a range is about the same as in the quadrangular cells 3, and hence detailed description is omitted. It is to be noted that in FIG. 7 and FIG. 8, for the purpose of simplifying the drawing, the same constitution as in the honeycomb structure 1 of the present embodiment is denoted by the same reference numerals.

Furthermore, in the honeycomb structure 1 of the present embodiment, a cell number of incomplete cells 13 which appear in the vicinity of the boundary line 12 between the first cell region 10a and the second cell region 10b is set to be 0.1% or less to a total number of the cells of the structure end face 8. Here, in the honeycomb structure 1 of the present embodiment, as compared to the "quadrangular" cells 3 having a complete shape, the incomplete cells 13 correspond to cells having an incomplete shape other than the quadrangular shape (e.g., a triangular shape or another polygonal shape) as shown in FIG. 3.

Here, in a case of constructing the cell regions 10a and 10b with the different cell structures and tilting the second partition walls 4b to the first partition walls 4a at the predetermined tilt angle θ, the incomplete cells 13 necessarily appear in the vicinity of the boundary line 12 as described above. In a case where the incomplete cells 13 are present at the above-mentioned ratio or more, turbulence easily occurs in the flow of the exhaust gas EG in the boundary region, and there is the fear that the strength of the honeycomb structure 1 decreases. Consequently, the cell number of the incomplete cells 13 is set to be 0.1% or less. It is to be noted that to eliminate the above defects, there may be constructed a honeycomb structure (not shown) in which the incomplete cells 13 are not present at all.

Furthermore, the honeycomb structure 1 of the present embodiment is formed so that a maximum cell region (not shown) having a maximum end face area S1 in at least two cell regions occupies a ratio of 25 to 75% to an area S of the whole structure end face in the structure end face 8. That is, a value of the maximum end face area S1/the area S of the whole structure end face×100 is set to the above range. Here, in a case where the structure end face 8 is divided into a plurality of cell regions or the like, when an area occupied by each cell region is excessively small, it is difficult to achieve the uniformity of the flow rate of the exhaust gas EG. Therefore, the end face area S1 of the maximum cell region is set to be in excess of at least 25%.

On the other hand, when the end face area S1 of the maximum cell region is excessively large (e.g., 95% or more), it is not similarly possible to achieve the uniformity of the flow rate of the exhaust gas EG. Therefore, the end face area S1 of the maximum cell region is set so that an upper limit value of the area is not in excess of 75%.

3. Manufacturing Method of Honeycomb Structure

The honeycomb structure of the present invention can be manufactured through well-known steps of extruding a kneaded material of a forming material by use of an extrusion machine, followed by drying, firing and others. The respective steps of the extrusion and others are well known, and hence detailed description is omitted here. Furthermore, there is not any special restriction on a material of the honeycomb structure, and a porous ceramic material is usable. For example, there is usable cordierite, alumina, mullite, silicon nitride, silicon carbide, aluminum titanate, zirconia, a metal silicon-silicon carbide composite material or the like.

At this time, a slit shape of a forming die to be attached to an extrusion port of the extrusion machine is formed in accordance with a cell shape, a cell density, and a partition wall thickness of each of the first cell structure 9a and the second cell structure 9b, so that the honeycomb structure of the present invention can be formed by monolithic formation (a monolithic forming step). In this case, in accordance with the slit shape of the forming die, the circumferential portions 14 to surround the respective cell regions 10a and 10b are also simultaneously formed.

Figure 9:
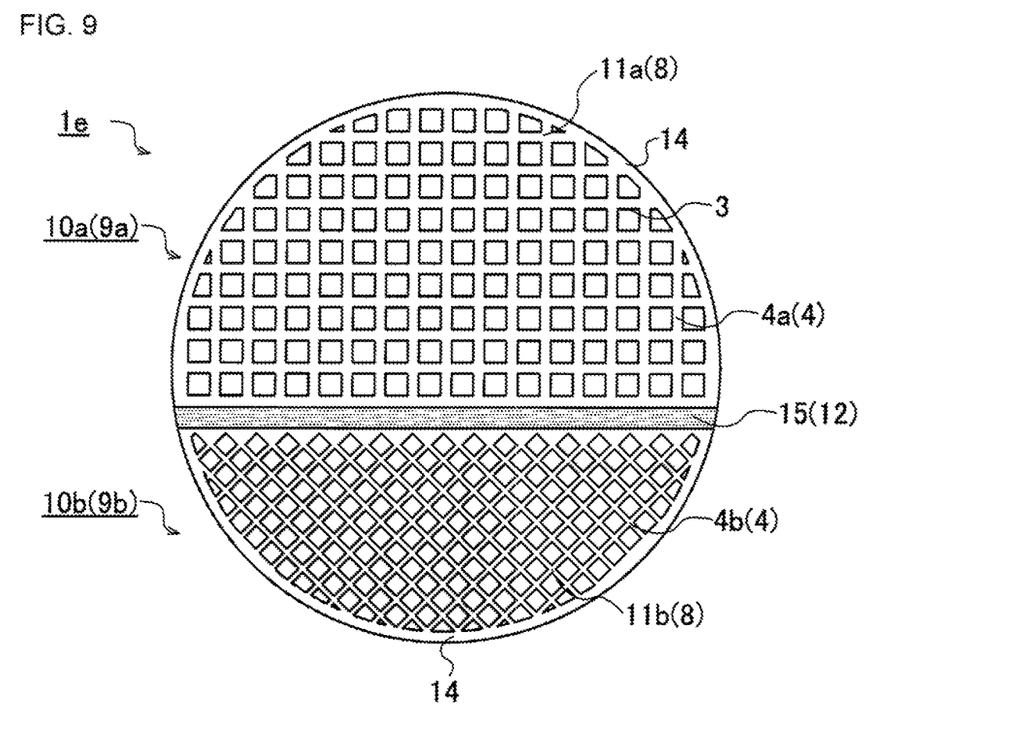
FIG. 9 is a plan view schematically showing one example of a honeycomb structure having a bonding portion.

On the other hand, as another example constitution of the manufacturing method of the honeycomb structure of the present invention, there may be manufactured a honeycomb structure 1e having a bonding portion 15 interposed between a first cell region 10a and a second cell region 10b as shown in FIG. 9. In this case, extrusion of each of the cell regions 10a and 10b is separately performed with the above extrusion machine (a cell region forming step). It is to be noted that in FIG. 9, for the purpose of simplifying the description, the same constitution as in the honeycomb structure 1 of the present embodiment is denoted by the same reference numerals. Furthermore, the honeycomb structure 1e of FIG. 9 does not have any incomplete cells 13 (see FIG. 2 and the like) in a boundary region.

That is, there may be employed a technique for use in forming a plurality of quadrangular pillar-shaped honeycomb segments which have heretofore been well known and combining these segments to construct a honeycomb structure having a large honeycomb diameter. Consequently, the separately extruded cell regions 10a and 10b are combined and bonded (a bonding step).

Here, as the bonding material which bonds the cell regions 10a and 10b to each other, for example, a well-known SiC bonding material or an adhesive material for use in a circumference coating material is usable. As a result, the bonding portion 15 is formed in the boundary region between the first cell region 10a and the second cell region 10b. Consequently, a strength in the boundary region between the first cell region 10a and the second cell region 10b can be secured, and a strength of the honeycomb structure 1e can improve.

Hereinafter, examples of the honeycomb structure of the present invention and examples of the manufacturing method of the honeycomb structure will be described, but the honeycomb structure of the present invention and the manufacturing method of the honeycomb structure are not especially limited to these examples.

EXAMPLES (1) Honeycomb Structure (Examples 1 to 20 and Comparative Examples 1 to 4)

On the basis of the above-mentioned manufacturing method of the honeycomb structure, a plurality of honeycomb structures (Examples 1 to 20 and Comparative Examples 1 to 4) were prepared each of which was constituted of a plurality of cell regions having different cell structures. Table 1 shows a summary of the results of Examples 1 to 20 and Comparative Examples 1 to 4 as follows. Table 1 shows "X/Y" in each of columns of a first cell structure, a second cell structure and a third cell structure, in which X is a length per $\frac{1}{1000}$ inches and Y is a cell number per square inch.

TABLE 1

| | | | | First cell region | | Second cell region | | Third cell region | | Ratio occupied by first cell region | | |
|---|---|---|---|---|---|---|---|---|---|---|---|---|
| | First cell structure | Second cell structure | Third cell structure | Partition wall thickness/ mm | Cell density/ cells/ cm$^2$ | Partition wall thickness/ mm | Cell density/ cells/ cm$^2$ | Partition wall thickness/ mm | Cell density/ cells/ cm$^2$ | to area of whole structure end face/% | Ratio of in- complete cells/% | Tilt angle θ/° |
| Example 1 | 5/300 | 4/400 | — | 0.132 | 47 | 0.114 | 62 | — | — | 72 | 0.06 | 7 |
| Example 2 | 5/300 | 4/400 | — | 0.132 | 47 | 0.114 | 62 | — | — | 65 | 0.03 | 10 |
| Example 3 | 5/300 | 4/400 | — | 0.132 | 47 | 0.114 | 62 | — | — | 46 | 0.02 | 36 |
| Example 4 | 4/400 | 3/600 | — | 0.114 | 62 | 0.089 | 93 | — | — | 55 | 0.07 | 22 |
| Example 5 | 4/400 | 3/600 | — | 0.114 | 62 | 0.089 | 93 | — | — | 71 | 0.05 | 23 |
| Example 6 | 4/400 | 3/600 | — | 0.114 | 62 | 0.089 | 93 | — | — | 64 | 0.06 | 22 |
| Example 7 | 5/300 | 3/600 | — | 0.132 | 47 | 0.089 | 93 | — | — | 52 | 0.09 | 25 |
| Example 8 | 5/300 | 4/400 | — | 0.132 | 47 | 0.114 | 62 | — | — | 46 | 0.01 | 42 |
| Example 9 | 5/300 | 4/400 | — | 0.132 | 47 | 0.114 | 62 | — | — | 22 | 0.02 | 32 |
| Example 10 | 5/300 | 4/400 | — | 0.132 | 47 | 0.114 | 62 | — | — | 78 | 0.03 | 28 |
| Example 11 | 5/300 | 4/400 | — | 0.132 | 47 | 0.114 | 62 | — | — | 51 | 0.21 | 33 |
| Example 12 | 5/300 | 4/400 | — | 0.132 | 47 | 0.114 | 62 | — | — | 49 | 0.15 | 42 |
| Example 13 | 5/300 | 4/400 | 5/300 | 0.132 | 47 | 0.114 | 62 | 0.132 | 47 | 25 | 0.02 | 22 |
| Example 14 | 5/300 | 4/400 | 3/600 | 0.132 | 47 | 0.114 | 62 | 0.089 | 93 | 26 | 0.03 | 27 |
| Example 15 | 4/400 | 3/600 | 5/300 | 0.114 | 62 | 0.089 | 93 | 0.132 | 47 | 45 | 0.01 | 33 |
| Example 16 | 4/400 | 3/600 | 4/400 | 0.114 | 62 | 0.089 | 93 | 0.114 | 62 | 52 | 0.05 | 31 |
| Example 17 | 4/400 | 3/600 (HEX) | 4/400 | 0.114 | 62 | 0.089 | 93 | 0.114 | 62 | 44 | 0.05 | 67 |
| Example 18 | 4/400 (HEX) | 3/600 | 4/400 | 0.114 | 62 | 0.089 | 93 | 0.114 | 62 | 41 | 0.02 | 68 |
| Example 19 | 5/300 | 4/400 | — | 0.132 | 47 | 0.114 | 62 | — | — | 71 | 0.04 | 3 |
| Example 20 | 5/300 | 4/400 (HEX) | — | 0.132 | 47 | 0.114 | 62 | — | — | 69 | 0.03 | 62 |
| Comparative Example 1 | 5/300 | — | — | 0.132 | 47 | — | — | — | — | 100 | 0 | — |
| Comparative Example 2 | 4/400 | — | — | 0.114 | 62 | — | — | — | — | 100 | 0 | — |
| Comparative Example 3 | 3/600 | — | — | 0.089 | 93 | — | — | — | — | 100 | 0 | — |
| Comparative Example 4 | 5/300 | 4/400 | — | 0.132 | 47 | 0.114 | 62 | — | — | 34 | 0.02 | 0 |

Here, each of Examples 1 to 12 is a honeycomb structure including two cell regions (a first cell region and a second cell region) constituted of different cell structures (a first cell structure and a second cell structure), and each of Examples 13 to 18 is a honeycomb structure further having a third cell region constituted of a third cell structure. Furthermore, in each of Examples 1 to 16 and 19, cells are quadrangular, whereas in each of Examples 17 and 20, cells of the second cell structure are hexagonal (HEX), and in Example 18, cells of the first cell structure are hexagonal.

Furthermore, in Table 1, the first cell region constituted of the first cell structure corresponds to a maximum cell region having an end face area of a maximum block end face. The honeycomb structures of Examples 1 to 20 satisfy all the conditions stipulated in the present invention. Furthermore, Examples 1 to 20 (excluding Example 9) satisfy the conditions that a ratio occupied by the first cell region to the area of the whole structure end face is in a range of 25 to 75% stipulated in the present invention. Furthermore, Examples 1 to 20 (excluding Examples 11 and 12) satisfy the conditions that a ratio of incomplete cells in a boundary region is 0.1% or less, and a tilt angle θ of second partition walls of the second cell structure to first partition walls of the first cell structure (or third partition walls of the third cell structure to the second partition walls of the second cell structure) is in a stipulated range.

On the other hand, each of Comparative Examples 1 to 3 is a honeycomb structure which only has one type of cell structure, i.e., a conventional honeycomb structure. Furthermore, Comparative Example 4 has two cell structures, but the tilt angle θ of the second partition walls to the first partition walls deviates from the stipulated range.

As to each of the respective honeycomb structures of Examples 1 to 20 and Comparative Examples 1 to 4 described above, an $NO_x$ purification ratio, a pressure loss and an isostatic strength were measured.

<Evaluation Item 1: Measurement of $NO_x$ Purification Ratio>

A testing gas including $NO_x$ was passed through a honeycomb structure, and furthermore, an amount of $NO_x$ in a gas emitted from the honeycomb structure was analyzed with a gas analyzer (MEXA9100EGR manufactured by HORIBA, Ltd.), to obtain a value of the $NO_x$ purification ratio. Here, a gas temperature of the testing gas to flow into the honeycomb structure was set to 200° C., and an infrared image furnace was used for preparation of the testing gas. As the testing gas for use, there was used a gas obtained by mixing nitrogen with 5 vol % of carbon dioxide, 14 vol % of oxygen, 350 ppm (on the basis of a volume) of carbon monoxide, 350 ppm (on the basis of a volume) of ammonia, and 10 vol % of water. Furthermore, a space velocity (SV) when the testing gas flowed into the honeycomb structure was set to 100000 $h^{-1}$. The $NO_x$ purification ratio was measured on the basis of these testing conditions. Table 2 mentioned below shows judgment standards of the $NO_x$ purification ratios of the respective examples and comparative examples. Furthermore, in the judgment standards shown in Table 2, the severest conditions among the respective combinations of the cell structures were applied to the honeycomb structure constituted of three coupled cell structures as in Example 13 to Example 18, and judgment was performed.

Further specifically, the $NO_x$ purification ratio in Table 2 is obtained by dividing, by the amount of $NO_x$ in the testing gas, a value obtained by subtracting the amount of $NO_x$ in the emitted gas from the honeycomb structure from the amount of $NO_x$ in the testing gas, and multiplying the value by 100.

<Evaluation Item 2: Measurement of Pressure Loss>

Air was passed through the honeycomb structure placed under room temperature conditions from its one end face to the other end face at 25° C., 1 atm, and a flow rate of 10 $Nm^3$/min. At this time, a pressure of air in one end face on an inflow side and a pressure of air in the other end face on an outflow side were measured, respectively, and a difference between the obtained pressure measured values was defined as a value of the pressure loss. Table 2 mentioned below shows judgment standards of the pressure losses of the respective examples and comparative examples.

<Evaluation Item 3: Isostatic Strength>

For the isostatic strength, by a method determined in JASOM 505-87, the honeycomb structure was inserted into a flexible tube, the tube was placed under water to apply a hydraulic pressure to the tube, and a pressure value when the breakdown occurred was measured. It is indicated that as this isostatic strength is higher, a reliability in canning the honeycomb structure in a metal case is higher. Table 2 mentioned below shows judgment standards of the isostatic strengths of the respective examples and comparative examples.

TABLE 2

| | Combination of cell structures | Excellent | Good | Failure |
|---|---|---|---|---|
| NO$x$ purification ratio | 5/300-4/400 | 55% or more | — | Smaller than 55% |
| | 5/300-3/600 | 60% or more | — | Smaller than 60% |
| | 4/400-3/600 | 65% or more | — | Smaller than 65% |
| Pressure loss | 5/300-4/400 | 110 kPa or less | — | In excess of 110 kPa |
| | 5/300-3/600 | 125 kPa or less | — | In excess of 125 kPa |
| | 4/400-3/600 | 135 kPa or less | — | In excess of 135 kPa |
| Isostatic strength | Ratio of incomplete cells is 0.1% or less | 1.0 MPa or more | — | — |
| | Ratio of incomplete cells is in excess of 0.1% | — | Smaller than 2.5 MPa | — |

Table 3 mentioned below shows a summary of the measurement results of the above $NO_x$ purification ratio, pressure loss and isostatic strength.

TABLE 3

| | NO$x$ purification ratio/% | Pressure loss/kPa | Isostatic strength/MPa |
|---|---|---|---|
| Example 1 | 62 | 110 | 3.8 |
| Example 2 | 63 | 110 | 4 |
| Example 3 | 63 | 110 | 4.5 |
| Example 4 | 72 | 135 | 3.5 |
| Example 5 | 73 | 135 | 4.2 |
| Example 6 | 71 | 135 | 4.0 |
| Example 7 | 67 | 125 | 3.7 |
| Example 8 | 64 | 110 | 4.2 |
| Example 9 | 58 | 109 | 3.8 |
| Example 10 | 57 | 108 | 3.6 |
| Example 11 | 56 | 107 | 2.2 |
| Example 12 | 57 | 108 | 2.3 |
| Example 13 | 66 | 109 | 3.6 |
| Example 14 | 70 | 132 | 3.4 |

TABLE 3-continued

|  | NOx purification ratio/% | Pressure loss/kPa | Isostatic strength/MPa |
|---|---|---|---|
| Example 15 | 71 | 130 | 3.7 |
| Example 16 | 72 | 131 | 3.5 |
| Example 17 | 71 | 129 | 3.6 |
| Example 18 | 73 | 128 | 3.7 |
| Example 19 | 64 | 110 | 3.6 |
| Example 20 | 64 | 109 | 3.5 |
| Comparative Example 1 | 50 | 100 | 4.2 |
| Comparative Example 2 | 55 | 120 | 4.5 |
| Comparative Example 3 | 60 | 150 | 3.8 |
| Comparative Example 4 | 63 | 110 | 1.9 |

As shown in Table 3, as compared to the conventional honeycomb structure constituted of one type of cell structure (Comparative Examples 1 to 3), the $NO_x$ purification ratio indicated the result equal to or better than that in Comparative Example 1 or the like, in each of the honeycomb structures of Examples 1 to 20. Especially, the honeycomb structure constituted of three types of cell structures (Examples 13 to 18) indicated a high value of the $NO_x$ purification ratio. Furthermore, the examples also substantially indicated a pressure loss value equal to or smaller than that in Comparative Examples 1 to 3, and an effect of inhibiting the pressure loss was confirmed. Further in the examples, it was confirmed that the isostatic strength did not noticeably change and a practically sufficient strength was held as compared with the conventional honeycomb structures. Furthermore, as compared with a case where the tilt angle θ of the second partition walls to the first partition walls was 0° as in Comparative Example 4, the value of the isostatic strength increased in each of Examples 1 to 20. That is, it has been confirmed that due to the tilt of the second partition walls to the first partition walls, the isostatic strength of the honeycomb structure improves. Consequently, for example, even in a case where an external force is applied during the canning, it is possible to inhibit generation of cracks in a boundary surface between the cell regions adjacent to each other.

A honeycomb structure of the present invention is especially suitably utilizable as a part of an exhaust gas purifying device for a purifying treatment of $NO_x$ included in an exhaust gas of a diesel engine, and by a manufacturing method of the honeycomb structure, it is possible to suitably manufacture the honeycomb structure to be utilized in the exhaust gas purifying device.

DESCRIPTION OF REFERENCE NUMERALS 1, 1a, 1b, 1c, 1d, 1e and 101: honeycomb structure, 2 and 100: exhaust gas purifying device, 3: cell, 4: partition wall, 4a: first partition wall, 4b: second partition wall, 5 and 102: honeycomb catalytic body, 6a and 103a: inflow portion, 6b and 103b: emitting portion, 7 and 104: case, 8 and 105: structure end face, 9a: first cell structure (a cell structure), 9b: second cell structure (a cell structure), 10a: first cell region (a cell region), 10b: second cell region (a cell region), 10c: third cell region (a cell region), 11a and 11b: block end face, 12: boundary line, 13: incomplete cell, 14: circumferential portion, 15: bonding portion, CG: purified gas, EG: exhaust gas (a fluid), I: inner peripheral side, O: outer peripheral side, CR: exhaust channel route, and X: axial direction.

What is claimed is:

1. A honeycomb structure comprising partition walls defining a plurality of polygonal cells which become through channels for a fluid,
    wherein a structure end face vertical to an axial direction of the honeycomb structure has at least two cell regions possessing mutually different cell structures and surrounded by circumferential portions, and
    in the cell regions adjacent to each other, all partition walls of the cell structure of one cell region are tilted with respect to all partition walls of the cell structure of the other cell region,
    wherein the circumferential portion of each cell region forms the outer surface of the honeycomb structure.

2. The honeycomb structure according to claim 1,
    wherein the cells are quadrangular, and
    a tilt angle of the partition walls of the cell structure of the other cell region to the partition walls of the cell structure of the one cell region is in a range of 3 to 45°.

3. The honeycomb structure according to claim 1,
    wherein the cells are hexagonal, and
    a tilt angle of the partition walls of the cell structure of the other cell region to the partition walls of the cell structure of the one cell region is in a range of 65 to 90°.

4. The honeycomb structure according to claim 1,
    wherein a cell number of incomplete cells which appear in a boundary line between the one cell region and the other cell region and have an incomplete shape is 0.1% or less to a total number of the cells of the structure end face.

5. The honeycomb structure according to claim 1,
    wherein a maximum cell region having a maximum end face area in the at least two cell regions occupies a ratio of 25 to 75% to a total structure end face area of the structure end face.

6. The honeycomb structure according to claim 1, which comprises a bonding portion interposed between the cell regions.

7. A manufacturing method of a honeycomb structure to manufacture the honeycomb structure according to claim 1 which comprises partition walls defining a plurality of polygonal cells to become through channels for a fluid and in which a structure end face vertical to an axial direction is formed by combining at least two cell regions possessing mutually different cell structures and surrounded by circumferential portions and in which in the cell regions adjacent to each other, to all partition walls of the cell structure of one cell region, all partition walls of the cell structure of the other cell region are tilted,
    the manufacturing method comprising a monolithic forming step of extruding a forming material and monolithically forming the honeycomb structure,
    wherein the circumferential portion of each cell region forms the outer surface of the honeycomb structure.

8. A manufacturing method of a honeycomb structure to manufacture the honeycomb structure according to claim 1 which comprises partition walls defining a plurality of polygonal cells to become through channels for a fluid and in which a structure end face vertical to an axial direction is formed by combining at least two cell regions possessing mutually different cell structures and surrounded by circumferential portions and in which in the cell regions adjacent to each other, to all partition walls of the cell structure of one cell region, all partition walls of the cell structure of the other cell region are tilted,
    the manufacturing method comprising:
    a cell region forming step of extruding a forming material and separately forming the cell regions; and a bonding step of combining and bonding the at least two formed cell regions, wherein the circumferential portion of each cell region forms the outer surface of the honeycomb structure.

* * * * *